United States Patent [19]

Graetz et al.

[11] Patent Number: 4,555,290

[45] Date of Patent: Nov. 26, 1985

[54] METHOD OF MAKING CASSETTE HOLDERS

[75] Inventors: Herbert Graetz, Chicago, Ill.; Ronald C. Unterreiner, Cape Girardeau, Mo.

[73] Assignee: Blair Industries, Inc., Scott City, Mo.

[21] Appl. No.: 601,949

[22] Filed: Apr. 19, 1984

[51] Int. Cl.[4] .............................................. B29C 3/04
[52] U.S. Cl. ....................................... 156/245; 156/250; 156/285; 206/557; 206/562; 206/563; 206/564; 206/565
[58] Field of Search ............... 156/245, 250, 252, 285; 264/545; 206/557, 558, 560, 562, 563, 564, 565; 53/450, 453, 456

[56] References Cited

U.S. PATENT DOCUMENTS

| | | | |
|---|---|---|---|
| 3,512,332 | 5/1970 | Klein | 53/453 |
| 3,577,700 | 5/1971 | Bippus et al. | 53/453 |
| 3,673,760 | 7/1972 | Canamero et al. | 53/453 |
| 3,902,598 | 9/1975 | Koob et al. | 206/387 |
| 4,175,995 | 11/1979 | Walter | 156/285 |
| 4,184,594 | 1/1980 | Hehn | 206/387 |
| 4,209,957 | 7/1980 | Utzmenn | 53/453 |
| 4,277,931 | 7/1981 | Mahaffy et al. | 53/453 |
| 4,432,827 | 2/1984 | Graetz et al. | 156/245 |

FOREIGN PATENT DOCUMENTS 2503667 10/1982 France ............................... 206/387

Primary Examiner—Caleb Weston

Attorney, Agent, or Firm—Hill, Van Santen, Steadman & Simpson

[57] ABSTRACT

Book style cassette holders or albums are mass produced from sheets of thermoplastics material by unwinding a relatively rigid or stiff thermoplastic sheet from a roll and successively thermal forming the sheet into a plurality of pairs of adjoining trays in side-by-side relation connected by flexible spines and surrounded by marginal portions. The thermal formed areas, preferably composed of two rows of album trays with two sets in each row, are successively severed from the sheet into blanks. Each tray portion of a blank has a bottom surrounded by a hollow peripheral wall with the hollow face of the wall surrounded by a rim providing a pocket. The blanks are fed successively, hollow face upwardly, through a plurality of stations which successively apply adhesive in the pockets, deposit cardboard stiffeners in the pockets, feed a flexible cover sheet and, if desired, a film sheet over all or part of the cover sheet. Printed sheets can also be deposited on the cover sheet and thus covered by the film sheet. The deposited sheets are thermal bonded to the margins surrounding the pairs of trays, the holders or albums are cut free from the blanks, cover sheet and film, the waste marginal portions of the blanks and sheets are wound into a roll and the individual albums are conveyed in open condition to a station where they are manually inspected, closed and packaged for shipment. The entire process is carried out in a straightline operation requiring little manual attention.

21 Claims, 9 Drawing Figures

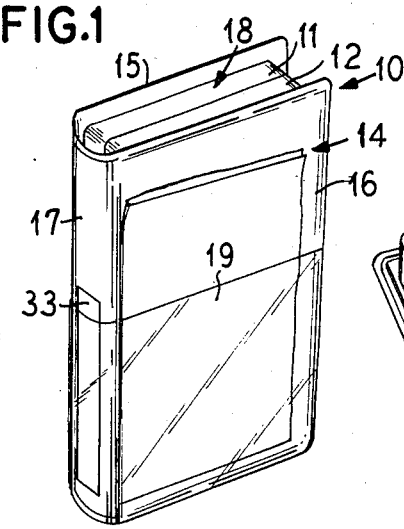
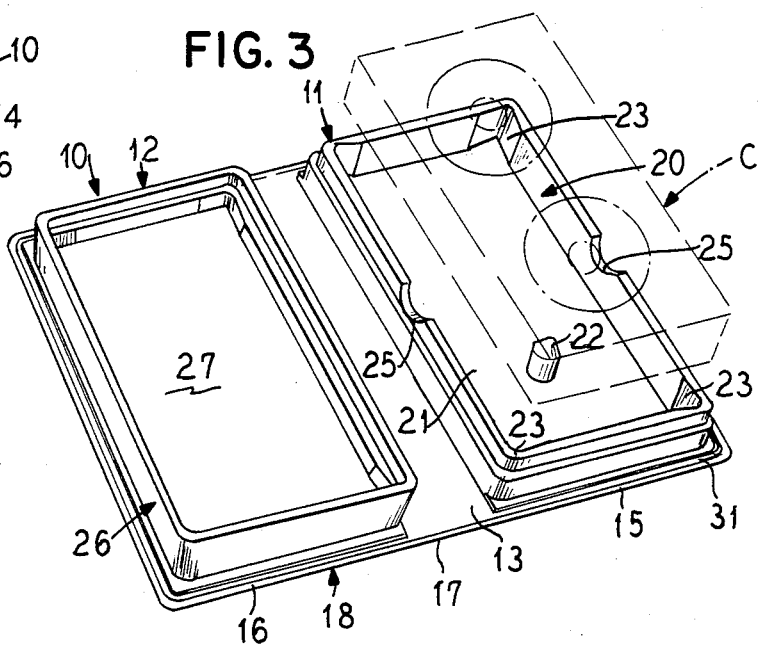
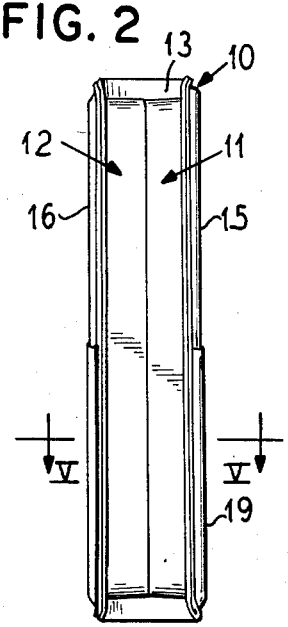
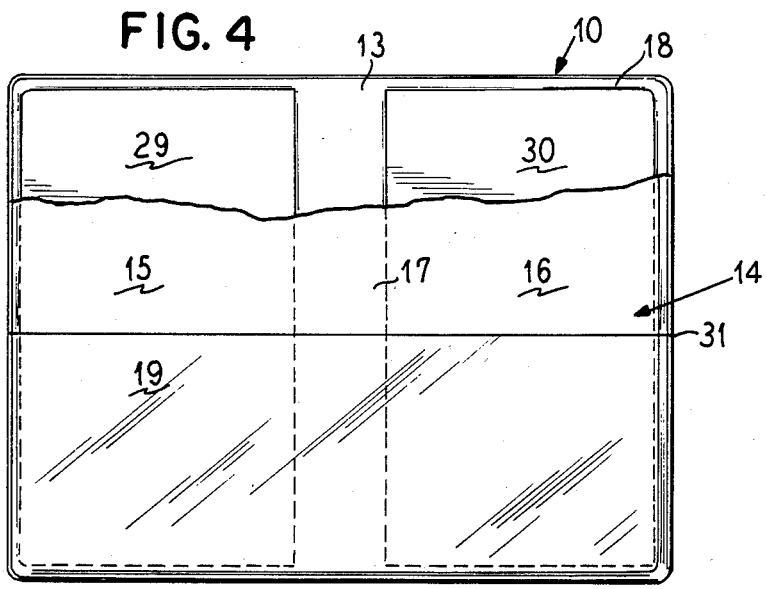
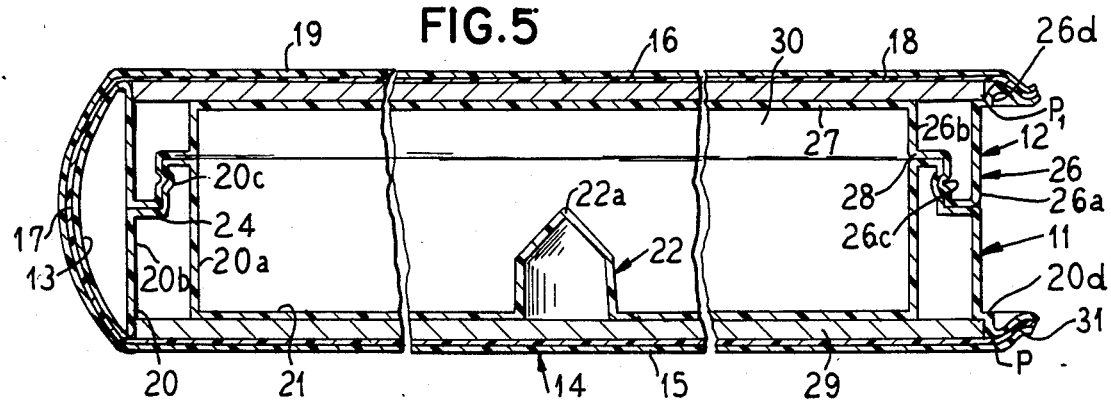

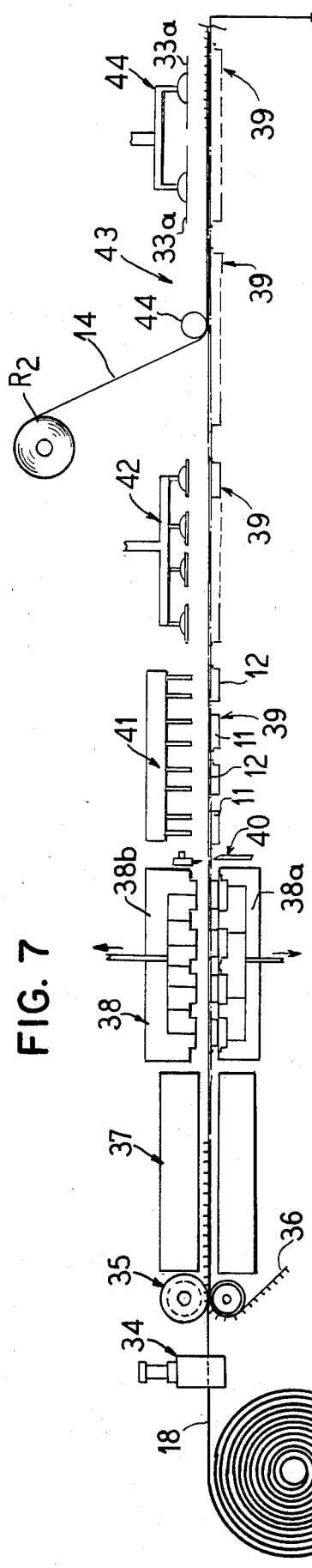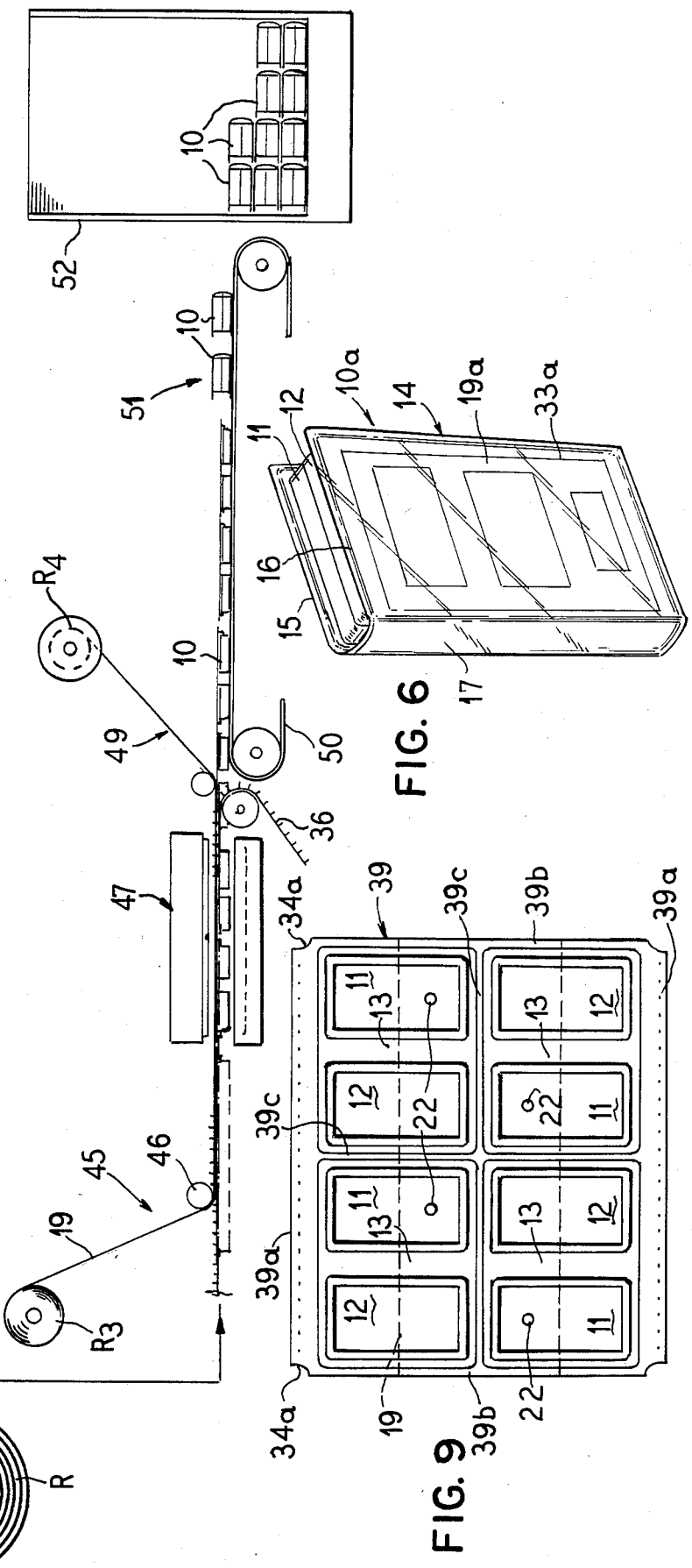
FIG. 7
FIG. 6
FIG. 9

METHOD OF MAKING CASSETTE HOLDERS

BACKGROUND OF THE INVENTION

Related Application

This application is related to the Herbert Graetz and Ronald C. Unterreiner copending application, entitled "Method of Making Cassette Holders", U.S. Ser. No. 489,781, now U.S. Pat. No. 4,432,827 issued Feb. 21, 1984, filed April 29, 1983 as a division of application, Ser. No. 376,147, filed May 7, 1982, now U.S. Pat. No. 4,407,410, issued Oct. 4, 1983, entitled "Book Type Cassette Holder".

Field of the Invention

This invention relates to the art of making book style albums or holders from thermoplastic sheets, and particularly deals with an improved method where a stiff thermoplastic sheet is thermal formed into blanks providing a plurality of albums or holders, the blanks are fed successively in line through stations which automatically apply adhesive, rigidifying cardboard slabs, a cover sheet, and a pocket forming film over the cover sheet. The sheet, film, and blanks are thermal welded together forming a continuous web of blanks, cover and film with the slabs sandwiched between the blanks and cover and with the film overlying the cover. The finished albums are cut from this web, the waste marginal web material is wound into a roll, and the individual albums are conveyed in open condition to a receiving station where they are manually inspected, manually closed, and packaged for shipment. If desired, printed pages can be inserted between the film and cover to describe or advertise the contents of the album.

Prior Disclosures

In our aforesaid, U.S. Pat. No. 4,432,827, we have disclosed a method of making cassette holders where the thermoformed blanks are deposited in a receiving station of a turn table which rotates to successive stations where the slabs are deposited, individual cover sheet blanks and film strip blanks are applied and thermal welding and cutting is performed. These operations are relatively slow requiring much handling, cutting and trimming, formation of individual blanks, and wide margins on the blanks had to be improved involving wastage of material.

It would then be an improvement in this art to speed up the production of book style albums, reduce the required number of operators and eliminate heretofore required cutting of blanks, handling of individual blanks and minimizing loss of materials from required wide margins.

SUMMARY OF THIS INVENTION

According to this invention cassette holders of the type disclosed in our aforesaid U.S. Pat. No. 4,407,410 are formed from rolls of sheet material and cardboard slabs in a straight line operation which thermoforms the leading end of a stiff thermoplastic sheet into a plurality of pairs of interfitting trays in side-by-side relation connected by a flexible spine portion. The blanks are cut from the sheet, picked up by a conveyor and successively advanced through stations which apply glue, deposit the cardboard slabs, feed the cover sheet over the slabs, if desired, deposit printed sheets over the cover sheet, deposit a film over the cover sheet or the printed sheets thereon, thermo weld the sheets together, sever the individual albums from the sheets and blanks, roll up the waste marginal material from the cuttings and convey the albums to a station where they are manually inspected, closed, and packaged for shipment. The cover sheet and film unites the individual blanks into a web and the individual albums are cut from this web and from margins around the thermoformed trays. The successive connecting together of the thermoformed blanks into a web minimizes required margin widths around the blanks and between the pairs of trays in the blanks and simplifies the welding and cutting operations.

The sheets and film forming the albums are of the same type disclosed in our aforesaid U.S. Pat. No. 4,407,410 with the sheet to be thermoformed into the trays and spine being a relatively rigid or stiff nonplasticized polyvinyl chloride with a thickness in the general range of 0.012 to 0.030 inches and a width of about 20 inches. The cover sheet is preferably a flexible polyvinyl chloride plasticized sheet having a thickness within the range of 0.01 to 0.018 inches. The film is a thin clear plasticized flexible polyvinyl chloride having a thickness in the range of 0.004 to 0.012 inches. The cardboard slabs have a thickness of about 0.05 to 0.10 inches. It should be understood however that coventional vacuum moldable thermoplastic sheets and conventional thermoplastic cover sheets and film are useful.

It is then an object of this invention to speed up the method of making cassette holders or book style albums of the type disclosed in our aforesaid U.S. Pat. No. 4,407,410 eliminating cutting, trimming, and blank handling operation of the process disclosed in our aforesaid U.S. Pat. No. 4,432,827.

Another object of this invention is to provide a straight line method of making cassette holders from thermoplastic sheets which uses a cover sheet to unite into a web a plurality of successive thermoformed blanks.

A further object of the invention is to minimize trim waste in a method of making cassette holders from thermoplastic sheets.

A specific object of the invention is to provide a method of making cassette holders or book style albums where a first thermoplastic sheet is unwound from a roll, successive leading ends of this sheet are vacuum formed into tray blanks each defining a plurality of pairs of album trays, the bottoms of the tray sections are covered with rigid cardboard slabs, a cover sheet is unreeled over the slabs, the stacked assembly thus formed is thermowelded, the individual albums are cut from the cover sheet and blank, the waste margin separated, and the albums delivered in opened condition to an inspection and closing station.

Other and further objects of this invention will become apparent to those skilled in this art from the following description of the annexed sheets of drawings which show the method of this invention and the type of albums made by the method.

On the drawings:

FIG. 1 is a perspective view of a holder or album made by the method of this invention illustrated in its closed position as viewed from the top and front of the cover flap side.

FIG. 2 is a rear elevational view of the holder of FIG. 1.

FIG. 3 is a perspective view of the holder of FIGS. 1 and 2 in its opened position, as viewed from the inside and showing in dotted lines a cassette for insertion in the holder.

FIG. 4 is a plan view of the outside of the holder in its open position with portions cut away to show underlying structure.

FIG. 5 is a broken transverse cross-sectional view along the line V—V of FIG. 2.

FIG. 6 is a view similar to FIG. 1 showing a modified album made by the method of this invention.

FIG. 7 is a diagramatic side view illustrating the making the albums of FIGS. 1 to 6 according to the method of this invention.

FIG. 9 is a plan view of a theromoformed blank produced in the method of this invention.

DESCRIPTION OF THE PREFERRED BEST MODE EMBODIMENT SHOWN ON THE DRAWING

Figure 8:
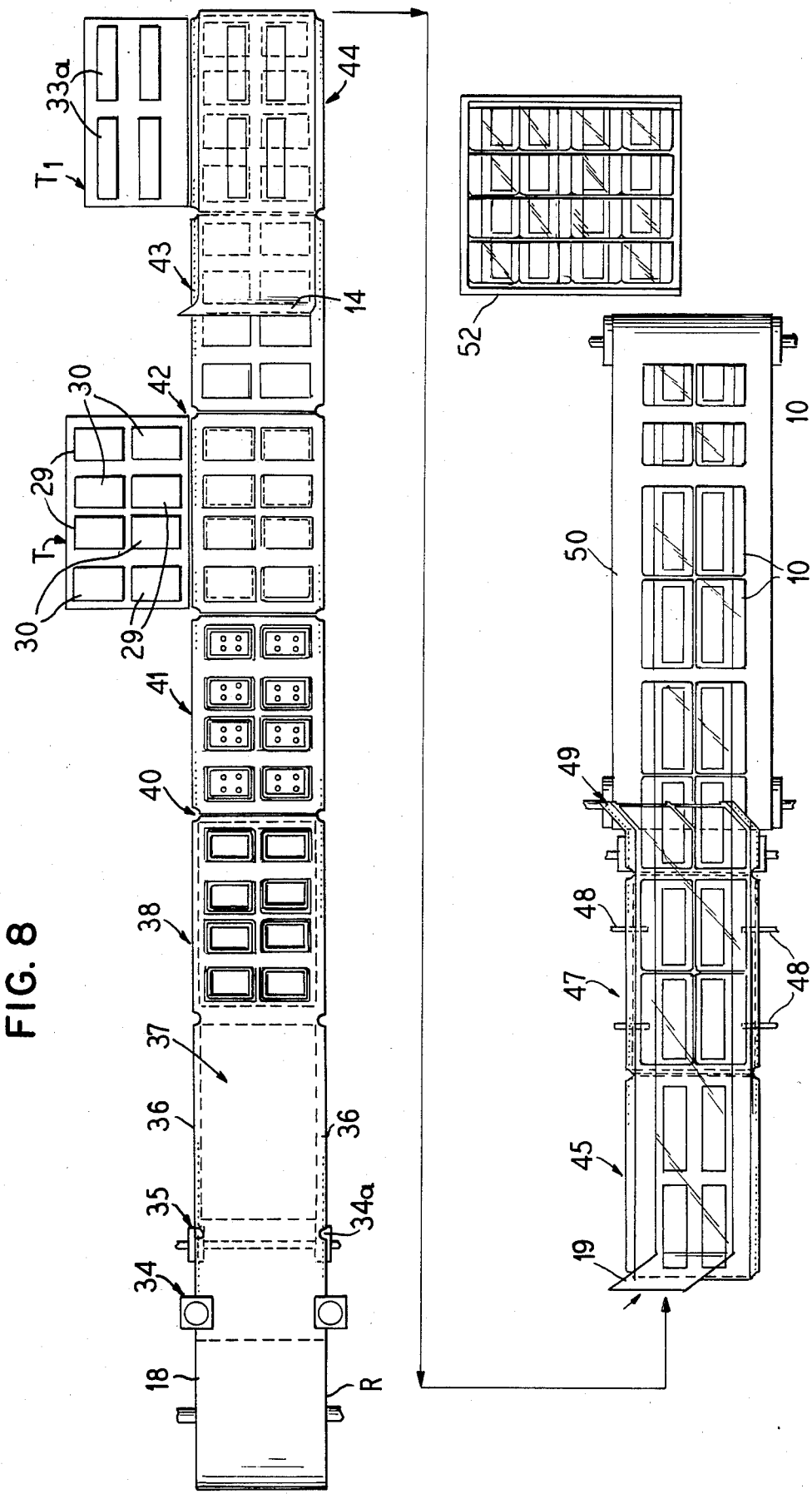
FIG. 8 is a diagramatic top plan view illustrating the method steps of FIG. 7.

The holder or album 10 of FIGS. 1 to 5 and 10a of FIG. 6 exemplify the articles made by the method of this invention but it should be understood that this method is not limited to the production of such articles. The holder 10 has a pair of relatively rigid interfitting trays 11 and 12 which are stacked together in the closed position as shown in FIGS. 1, 2 and 5 and which are separated in spaced parallel side-by-side relation by an integral flexible spine liner portion 13 when in the flat open position of FIGS. 3 and 4. A cover 14 has a rear or bottom flap 15 overlying the tray 11 and a front or top flap 16 overlying the tray 12 with an integral spine 17 connecting the flaps 15 and 16 at the front side of the holder.

The trays 11 and 12 are formed by vacuum molding a relatively rigid or stiff single sheet 18 of thermoplastic resin with a peripheral margin bonded to the front sheet cover 14 and with the connecting spine portion forming a liner underlying the spine portion 17 of the cover. A two-ply flexible spine is provided.

A strip 19 of plasticized flexible thermoplastic resin, preferably transparent, overlies any desired portion, such as the bottom half, of the cover being wrapped around both flaps 15 and 16 and the spine 17 and bonded at its ends and at its bottom to the side edges and bottom edge of the cover.

The molded tray portion 11 of the sheet 18 has a stepped upstanding hollow peripheral wall 20 surrounding a flat bottom 21 which is somewhat depressed from the original plane of the flat sheet 18 to form a pocket P in the hollow side of the molded sheet. A cylindrical cassette locator pin 22 with a connically pointed top end 22a is molded in the flat bottom 21 to project upwardly at the longitudinal center thereof, but is spaced closer to the bottom end of the tray than to the top end. The peripheral side wall 20 preferably has the four corners thereof thinned down as shown at 23 to provide air release gaps when a snug fitting cassette is inserted in the tray.

The peripheral side wall 20 has a flat innerface 20a with a slight draft angle preferably 3°, snuggly embracing the periphery of a cassette C with the taper of the face facilitating insertion and removal of the cassette to rest on the bottom 21 of the tray.

The peripheral wall 20 has a stepped upstanding outerface 20b with a horizontal rim 24 intermediate the height of the wall. The outerface 20b has dimples 20c just above the rim 24 which are positioned on the long sides of the peripheral walls near the ends. A pair of dimples is provided on each long side.

Arcuate depressions 25 are formed in the top edge of the wall 20 and the sides thereof about midway the length to provide finger openings for grasping the sides of the cassette C which is snuggly embraced by the wall to facilitate lifting of the cassette out of the tray.

The other tray 12 provides a lid for the tray 11 and also has an upstanding peripheral wall 26 surrounding a flat slightly depressed bottom 27 providing a pocket $P_1$ in the hollow side of the molded sheet 18. The wall 26, however, has a flat outerface 26a and a stepped innerface 26b with a flat shoulder 28 about midway of the height of the wall. The stepped face 26b is sized to snuggly embrace and interfit with the stepped outerface 20b of the wall 20 with the shoulder 28 resting on the rim 24 when the trays are in closed stacked condition as shown in FIGS. 1, 2 and 5. The long sides of the stepped interface 26b have nibs 26c therein to fit the dimples 20c when the trays are closed as shown in FIG. 5. The interfitting nibs and dimples snap together as the book is closed to hold the trays in closed sealed stacked relation.

The walls 20b and 26b are sufficiently flexible to accommodate the snapping together and the unsnapping of the nibs and dimples.

As shown in FIGS. 4 and 5, a rectangular rigid cardboard slab 29 is sandwiched between the bottom flap 15 and the bottom 21 of the tray 11 while a similar slab 30 is sandwiched between the cover flap 16 and the bottom 27 of the tray 12. The slabs fit in the pockets P and P. behind the bottoms 21 and 27 provided by the stepped out-turned shoulders 20d and 26d formed around the bottom ends of the outer sides of the walls 20b and 26a but extending only along the outer sides and ends of these walls. The inner sides edges of the pockets are defined by the sides of the spine liner 13.

The cover sheet 14, the tray sheet 18, and the pocket forming strip 19 are all sealed together around a crimped bead peripheral edge 31 which projects around the walls 20 and 26 of the trays 11 and 12 to provide a book cover edge for the album to hide the trays within the confines of the cover. However, the spine liner 13 connecting the trays 11 and 12 and the spine 17 connecting the cover flaps 15 and 16 are not bonded together along their lengths. Thus the cardboard inserts 29 and 30 are sealed in place in the pockets P and P1 under the bottoms 21 and 27 of the trays. The crimped bead 31 provides a finished margin for the book.

The spine liner portion 13 of the tray sheet 18 and the spine portion 17 of the cover sheet 14 are wider than the stacked closed height of the trays 11 and 12 and are flexible across their entire widths. The spine and its liner thus form a wide flexible hinge which will be arcuately bowed outwardly as the album is closed from its opened flat condition of FIG. 3 to its closed book simulating condition of FIGS. 1 and 2. This wide hinge distributes bending stresses and prevents development of creases as the cover flaps are repeatedly opened and closed. The outward bowing, as illustrated in FIG. 5 will draw the strip 19 into a taught condition closing the pockets between the strip and the cover. These pockets are useful to retain papers on the front flap 16 of the cover and to also retain a strip 33 over the spine in the front edge of the book. The papers and strip are easily inserted in the pockets when the album is in its open flat position as shown in FIGS. 3 and 4 where the pockets are in a relaxed condition.

It should be understood that the film 19 can cover any portion or all of the flaps 15 and 16 in the spine 17 and can be bonded around its entire periphery to seal in papers of printed matter advertising or defining the contents of the holder. Thus, as shown in FIG. 6 the album 10a has a film 19a covering all of the cover 14 and bonded all around its periphery to seal one or more printed sheets 33a between the cover and film. Otherwise the album 10a is identical with the album 10 of FIGS. 1-5 and corresponding parts have been marked with the same numerals.

The method of this invention for making the holders or albums 10 and 10a of FIGS. 1-6 is diagrammatically illustrated in FIGS. 7 and 8. As therein shown a reel R of the stiff or rigid polyvinyl chloride sheet material 18 is unwound to form a horizontal run which is fed through a first station 34 where semicircular notches 34a are punched into the side edges of the sheet at intervals defining the length of a blank to be cut from the sheet. The sheet 18 need only be about 19 inches wide to form a blank producing four sets of album trays.

The horizontal run of the notched sheet 18 is then fed through a second station 35 where the notched longitudinal margins of the sheet are punched to receive needle belts 36 which convey the sheet flatwise through a third station 37 which heats the sheet to a soft condition for thermal molding. The heated sheet is then conveyed to a thermoforming station 38 having a bottom evacuated die 38a and a top air pressure head 38b. This station 38 has die cavity to form a blank illustrated at 39 in FIG. 9 where two side-by-side rows of four pairs of trays 11 and 12, described above, are formed by pulling the sheet down into the die 38a under vacuum and by using air pressure from the head 38b to press the sheet tightly against the die walls. The trays 11 and 12 of course have the hollow peripheral wall described hereinabove and the trays of each pair are separated by the intervening spine liner 13.

After the thermoforming in station 38 is completed, the sheet is ejected from the die and advanced through a cutting station 40 where it is severed at the notches 34a produced in the first station 34 to form the individual successive blanks 39. The cutter 40 severs the blank from the sheet while it is still supported on the needle belts 36.

It will be especially noted that the blank 39 of FIG. 9 has relatively narrow side margins 39a perforated by the needles of the belts 36. These margins need only be in the nature of one inch or less in width as contrasted with heretofore required much wider margins for the blank used in the turn table process of our aforesaid U.S. Pat. No. 4,432,827. It will be further noted that the transverse margins 39b at the front and rear ends of the blank 39 are very narrow, in the nature of ¼ to ⅓ inch wide. The transverse and longitudinal trim margins 39c between the pairs of molded trays are also very narrow being of about the same order as the transverse margins 39b.

The needle belts 36 convey the blanks 39 successively under a glue spotting station 41 where droplets of adhesive are deposited in the rims of the pockets P and P1 of the thermoformed tray described and illustrated in FIG. 5.

The blank is then advanced to a cardboard slab applying station 42 where suction heads pick up the cardboard slabs 29 and 30 from a supply table T and deposit them into the pockets P and P1 over the glue spots provided in these pockets by the station 41.

The blank is then advanced from the station 42 to a station 43 where the cover sheet 14 is applied being conveniently fed from a roll $R_2$ under an applicator roll 44. The cover sheet 14 is fed in a taut condition over the blank 39 and the sheet and blank are advanced from the station 43 to a downstream station 44 where vacuum heads feed printed sheets 33a from a table $T_1$ to predetermined locations on top of the cover sheet 14. These locations may be such as to have the printed sheets 33a cover the front and rear flaps and the spine of the album or only portions thereof.

Next, the blank with the printed sheets 33a thereon is fed to a film applying station 45 where the film 19 from a roll $R_3$ is fed over the printed sheets 33a by an applicator roll 46. The film 19 can be wide enough to cover all of the flap and spine portions of the album, or, in the event the station 44 is not used, the film can be just wide enough to cover a portion of the album to form the open top pocket to receive inserts as shown in FIG. 1. For this purpose, as illustrated in dotted lines in FIG. 9, the narrow film sheet 19 is fed only over the mid section of the blank 39 and it will be noted that the pairs of trays in the separate longitudinal rows are so arranged that the film will cover the lower half portions of the albums.

The blank 39 is now composed of the bottom thermoformed tray section, the cardboard slabs, the printed advertising sheets, and the film. This stack of components is then advanced to a sealing and cutting station 47 which has suction fingers 48 pulling the cover sheet and film tightly together to exhaust any trapped air therebetween for preventing formation of wrinkles during the bonding operation. In the station 47 the tray blank 39, the cover sheet 14 and the film 19 are all bonded together forming the crimp bond 31 around the periphery of each album portion of the blank. This crimp bond 31 isolates the narrow margin 39a, 39b and 39c between the albums and cutters surrounding the bonding electrode sever the individual albums from the margins.

The waste margin material is then separated from the album at a station 49 where the waste material is wound into a roll $R_4$. At this point the pin belts 36 are separated from the cutoff margin material and the individual albums 10 are fed to a conveyor 50 where they are moved, face upward in opened position to an inspection and closing station 51 where they are manually inspected, closed and deposited in a shipping container 52.

The entire process can be serviced by a single operator with one or two additional inspectors and packers at the station 51. The in line successive stations are easily serviced and checked. The step-by-step advancing of the sheets and blanks is timed to the operation of the slowest station 47 where the thermal bonding and cutting takes place. The timing can be triggered by the notched portions 35a.

From the above descriptions it should therefore be understood that the process of this invention produces cassette holders or book albums with a minimum of effort at a high speed and with minimum wastage.

We claim as our invention:

1. The method of making book style albums which comprises unwinding a first thermoplastic sheet from a roll, heating the sheet, thermal forming the sheet to define a plurality of pairs of trays and lids in side-by-side relation connected by flexible spines with open top pockets surrounding the bottom faces of the trays, depositing rigid slabs in said pockets to cover said bottoms, unwinding a second thermoplastic sheet from a roll, covering the thermal formed first sheet with said second sheet, unwinding a third thermoplastic sheet, covering the second sheet on the thermal formed first sheet with said third sheet, bonding the sheets together forming a continuous web of albums, severing the separate albums from the web, winding the web into a roll, and conveying the albums to an inspection station.

2. The method of claim 1 including the added step of depositing adhesive in the pockets before depositing the slabs.

3. The method of claim 1 including the added step of depositing printed material sheets on the second sheet before covering the second sheet with the third sheet.

4. The method of claim 1 including the added steps of punching notches in the side edges of the first sheet before thermal forming and severing the sheet at these notches after thermal forming.

5. In the method of making book style albums from thermoplastic sheets, the improvement which comprises unwinding a first roll of stiff thermoplastic sheet material, successively thermoforming said stiff sheet into album blanks composed of a plurality of pairs of adjacent trays with the trays of each pair connected by an intermediate flexible spine and with the blanks being connected by narrow margins, unwinding a second roll of flexible thermoplastic sheet material, covering the thermoformed blanks with said flexible sheet from said second roll, thermal welding the flexible sheet and the blanks together, severing albums from the thermally welded second sheet and margins of the blanks, separating the margin material and severed flexible sheet material from the albums, and separately discharging the albums and the waste margin and flexible sheet material.

6. The method of claim 5 including the added step of depositing rigid slabs on the trays before covering the slabs with the second sheet.

7. The method of claim 6 wherein glue is deposited between the trays and slabs.

8. The method of claim 5 including the added step of covering the second sheet with a third film.

9. The method of claim 2 wherein printed sheets are interposed between the second sheet and film.

10. The method of claim 5 including the added steps of punching notches in the side edges of the rigid sheet before thermoforming, and severing the rigid sheet at these notches after thermoforming to form said blanks.

11. The method of making book style albums from a plurality of plastic material sheets which comprises unreeling a first stiff thermoplastic sheet from a roll, thermal forming successive segments of the stiff sheet into blanks defining a plurality of pairs of trays connected by flexible spines and having hollow upstanding peripheral walls with flat bottoms, covering the flat bottoms with rigid slabs, unwinding a second flexible thermoplastic material sheet from a roll, covering the slabs and the blanks with said second sheet, unwinding a third flexible thermoplastic sheet from a roll, covering the second sheet on the blanks with the third sheet, thermal welding the stacked sheets, severing finished albums from the thermal welded stack, separating the severed sheet material from the albums, and delivering the finished albums to an inspection station.

12. The method of claim 11 wherein printed sheets are sandwiched between the second sheet and third sheet.

13. The method of claim 11 wherein a plurality of rows of pairs of trays are thermoformed.

14. The method of making book style albums which comprises unwinding a first thermoplastic sheet from a roll, heating the sheet, thermoforming the sheet to define a plurality of pairs of trays and lids in side-by-side relation connected by flexible spines with open top pockets surrounding the bottom faces of the trays, depositing rigid slabs in said pockets to cover said bottom faces, unwinding a second thermoplastic sheet from a roll, covering the thermoformed first sheet with said second sheet, unwinding a third thermoplastic sheet from a roll, covering the second sheet on the thermoformed first sheet with said third sheet, welding the sheets together forming a continuous web of albums, severing separate albums from the web, and separately discharging the albums and the remaining waste sheet material of the web.

15. The method of claim 14 wherein the bonding of the third sheet is limited to three sides of the sheet to form a pocket opening at the fourth side to receive an insert between the second and third sheets.

16. The method of claim 15 including the added step of sandwiching printed sheets between the second and third sheets.

17. The method of making cassette albums which comprises unwinding a roll of stiff thermoplastic sheet material into an elongated run, attaching marginal side edges of the run to elongated conveyor belts, successively heating and thermoforming the belt engaged run of the sheet into album blanks composed of a plurality of pairs of adjacent trays with the trays of each pair connected by intermediate spines and with the adjacent blanks connected by narrow margins, transversely severing thermoformed successive blanks from the run, depositing rigid slabs on the top faces of the bottoms of the thermoformed trays in the successive blanks, forming a run of a flexible thermoplastic sheet, advancing the successive blanks under said run of the flexible thermoplastic sheet, welding the thermoplastic sheet to the blanks around the margins of the blanks, severing the albums from the blanks and flexible thermoplastic sheet, and separating the albums from the margins of the blanks and the flexible sheet portions covering these margins.

18. The method of claim 17 including the added step of covering the run of the flexible thermoplastic sheet with a transparent film prior to the welding step and simultaneously welding this film to the flexible thermoplastic sheet when said sheet is welded to the blanks.

19. The method of claim 17 including the step of depositing printed sheets on the flexible thermoplastic sheet before depositing the film.

20. The method of making book style albums which comprises unwinding a roll of stiff thermoplastic sheet material into an elongated run, attaching the full lengths of the marginal side edges of the run to elongated conveyor belts, successively heating and thermoforming the belt engaged run of the sheet material into album blanks composed of a plurality of pairs of adjacent trays with the trays of each pair connected by an intermediate spine and with the adjacent blanks connected by narrow margins, transversely severing thermoformed successive blanks from the run, maintaining the marginal side edges of the blanks attached to said elongated conveyor belts, advancing the blanks on said belts successively through a slab depositing station, a flexible thermoplastic sheet applying station, a welding station, and a severing station, depositing rigid slabs on the top faces of the bottoms of the thermoformed trays in the successive blanks at said slab applying station, depositing flexible thermoplastic sheet material over the slabs and thermoformed blanks at the flexible sheet applying station, welding the thermoplastic sheet material to the blanks around the margins of the blanks at the welding station to form albums composed of a pair of trays connected by a spine, a slab on the bottom of each tray and a cover over the trays, slabs and spine, severing the albums from the blanks and flexible thermoplastic sheet material at the severing station, stripping the margins of the blanks and the flexible sheet portions covering these margins from the belts and albums, and discharging the separated albums.

21. The method of claim 20 wherein the marginal side edges of the run of thermoplastic sheet material are pierced by needles on the elongated conveyor belts and remain attached to the needles through the severing station.

* * * * *